US006845655B2

(12) United States Patent
van der Weide et al.

(10) Patent No.: US 6,845,655 B2
(45) Date of Patent: Jan. 25, 2005

(54) HETERODYNE FEEDBACK SYSTEM FOR SCANNING FORCE MICROSCOPY AND THE LIKE

(75) Inventors: Daniel van der Weide, Madison, WI (US); Bjoern Rosner, Chicago, IL (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 10/390,334

(22) Filed: Mar. 17, 2003

(65) Prior Publication Data

US 2004/0182140 A1 Sep. 23, 2004

(51) Int. Cl.[7] .......................... G01B 5/28; G01N 13/16; G12B 21/08; G12B 21/20
(52) U.S. Cl. ...................................................... 73/105
(58) Field of Search .................. 73/105; 250/306, 250/307

(56) References Cited

U.S. PATENT DOCUMENTS

| | | | |
|---|---|---|---|
| 4,851,671 A | | 7/1989 | Pohl |
| 5,262,643 A | * | 11/1993 | Hammond et al. ......... 250/306 |
| 5,267,471 A | * | 12/1993 | Abraham et al. ............ 73/105 |
| 5,641,896 A | | 6/1997 | Karrai |
| 5,723,775 A | * | 3/1998 | Watanabe et al. ............ 73/105 |
| 5,939,719 A | | 8/1999 | Park et al. |
| 6,005,246 A | * | 12/1999 | Kitamura et al. .......... 250/306 |
| 6,005,251 A | | 12/1999 | Alexander et al. |
| 6,057,546 A | | 5/2000 | Braunstein et al. |
| 6,073,485 A | * | 6/2000 | Kitamura ..................... 73/105 |
| 6,265,718 B1 | | 7/2001 | Park et al. |
| 6,310,342 B1 | | 10/2001 | Braunstein et al. |

OTHER PUBLICATIONS

D.A. Walters, et al., "Short Cantilevers for Atomic Force Microscopy," Rev. Sci. Instrum., vol. 67, No. 10, Oct., 1996, pp. 3583–3590.
Mario B. Viani, et al., "Small Cantilevers for Force Spectroscopy of Single Molecules," Journal of Applied Physics, vol. 86, No. 4, Aug. 15, 1999, pp. 2258–2262.
Ami Chand, et al., "Microfabricated Small Metal Cantilevers with Silicon Tip for Atomic Force Microscopy," Journal of Microelectromechanical Systems, vol. 9, No. 1, Mar., 2000, pp. 112–116.

* cited by examiner

Primary Examiner—Daniel S. Larkin
(74) Attorney, Agent, or Firm—Foley & Lardner LLP

(57) ABSTRACT

Frequency translation of microelectromechanical vibration signals such as a tip vibration signal in a scanning force microscopy system expands the versatility of existing control systems and enables new signal processing techniques. The vibration signal such as the cantilever probe tip vibration signal of a scanning force microscopy is frequency converted to a lower or higher frequency signal that is utilized to provide a control signal.

24 Claims, 5 Drawing Sheets

HETERODYNE FEEDBACK SYSTEM FOR SCANNING FORCE MICROSCOPY AND THE LIKE

STATEMENT OF GOVERNMENT RIGHTS

This invention was made with United States government support awarded by the following agency: NSF 0196021. The United States government has certain rights in this invention.

FIELD OF THE INVENTION

The present invention relates generally to the field of scanning force microscopy and particularly to feedback control for scanning force microscopy.

BACKGROUND OF THE INVENTION

The advent of scanning force microscopy (SFM), also known as atomic force microscopy (AFM), has brought an instrument capable of microscopic surface studies with atomic resolution, suited for ambient and liquid environments and a wide variety of samples. SFM is a method for observing nanoscale topography and other properties of a surface. In general, SFM scans a force sensor over a surface.

SFM can be carried out in contact and non-contact modes. In a contact mode of operation, a topographical image is produced by measuring the deflection of a small cantilever beam which has a sharp probe attached to its free end. Higher areas of the surface deflect the cantilever more. This deflection is typically detected by reflecting a laser beam off of the back of the cantilever onto a photodiode that is connected to provide its output signal to a computer, which converts the signal into a number. In a constant height mode, the height of the scanner is constant and the cantilever deflection can be used directly to generate the topographical data. In a constant force mode, the height of the probe above the surface is adjusted until the cantilever deflection value reaches a setpoint. The image is generated from the scanner height data. As the cantilever probe scans the surface, an image is produced based on the height of the scanner, pixel by pixel, with the darkness of each pixel representing the height data at that pixel.

Non-contact modes differ from the contact mode in that the cantilever is driven to oscillate, typically at its resonant frequency, and the amplitude, phase or frequency or a combination of these parameters is measured, e.g., by a laser beam and photodiode. As the probe approaches the surface, the amplitude of cantilever oscillation or the resonant frequency of the cantilever beam changes due to interactions with the surface. A feedback loop adjusts the height of the scanner to keep the cantilever vibrational amplitude or the cantilever vibrational frequency at a constant value, which also maintains the average tip to sample distance constant, and the height of the scanner at each data point in the scan over the surface is recorded. The low force applied to the sample in the non-contact mode makes it particularly useful for imaging soft samples, for example, DNA-protein complexes. SFM can also be carried in an intermittent contact mode, in which the tip is brought closer to the sample than in a full non-contact mode so that at the bottom of its travel the tip just barely hits the sample.

To extract the tip-sample response from the probe in the non-contact mode or intermittent contact mode, many detection schemes exist, including filtering and rms-to-dc conversion as well as analog to digital conversion and subsequent data processing. To extract the tip signal with the highest possible signal to noise (S/N) ratio, the driving signal can be compared with the probe signal using, for example, logarithmic operational amplifiers, analog dividers or lock-in amplifiers.

The use in SFM of high-frequency probes with resonance frequencies above 500 kHz and into the MHz range offers several potential advantages over conventional probes vibrating at 500 kHz or lower. While a commonly cited advantage is minimized tip and sample damage, high-frequency cantilevers are also better suited to measure extremely small forces. It has been shown that the minimum detectable force of a cantilever can be decreased by decreasing the cantilever's coefficient of viscous damping. See F. Gittes, et al., European Biophysics Journal, Vol. 27, 1998, pp. 75, et seq. Other researchers have shown that the coefficient of viscous damping decreases with decreasing cantilever length and thus with increased resonant frequency. However, the use of a custom designed high-frequency cantilever also requires a custom designed feedback system since standard feedback systems are limited to cantilever vibration frequencies below about 500 kHz.

SUMMARY OF THE INVENTION

In accordance with the present invention, a method of frequency translation of a tip vibration signal in a scanning force microscope includes receiving a cantilever vibration signal from a scanning force microscope, frequency converting the cantilever vibration signal by heterodyning to a higher or lower frequency signal, and providing a cantilever control signal based on the frequency converted signal. Downconverting the vibration signal allows a lower frequency detection instrument such as a lock-in amplifier to be utilized. The high-frequency cantilever vibration signal can be downconverted to any desired frequency, which can allow conventional feedback controllers to be used. The invention can also be carried out to enable extremely high-quality filtering of the feedback signal by upconverting the probe vibration signal into the radio frequency range where resonant cavities can be used to provide bandpass filters with ultra-high Q factors that may be unachievable with discrete electronics.

The invention may also be utilized with multifunctional scanning probes as they are commonly employed for near-field optical microscopy. Typically, multifunctional probes measure topographical information, used to provide feedback, and another physical quantity, e.g. optical light intensity, in separate signals that are both oscillating with the probe vibration frequency. Demodulating the additional signal can be very advantageous. For example, in the case of near-field optical microscopy, the near-field signal is mostly isolated from far-field contributions after demodulation at the probe vibration frequency or multiples thereof. This signal must be demodulated independently of the SFM electronics. Often, this frequency exceeds the bandwidth of most lock-in amplifiers (usually 102 kHz), which are convenient and proven instruments for demodulation in SFM systems. In addition, the topographical signal may be processed via lock-in amplifiers, for example if both the amplitude and the phase are of interest at the same time. In general, adding the ability of frequency translation to an SFM system provides general flexibility and overall accessibility to all signals.

A system for frequency translation of a tip vibration signal in accordance with the invention that can be utilized with a conventional scanning force microscope includes means for receiving a cantilever vibration signal from a scanning force microscope, means for downconverting the cantilever vibration signal, and means for providing a cantilever height control signal based on the downconverted signal. The scanning force microscope system in accordance with the present invention preferably includes two signal generators, two mixers configured to receive at least one signal from the signal generators, and a low frequency detector configured to receive a reference signal from a first of the mixers and a downconverted signal associated with cantilever vibration from a second of the mixers. The low frequency detector, such as a lock-in amplifier, provides a demodulated cantilever control signal to the scanning force microscope controller.

The present invention may also be embodied in other types of microelectromechanical systems (MEMS) in addition to scanning force microscopes. Frequency conversion of vibration signals from vibrating MEMS elements may be advantageously carried out in accordance with the invention for monitoring and control purposes.

Further objects, features and advantages of the invention will be apparent from the following detailed description when taken in conjunction with the accompanying drawings.

BRIEF DESCRIPTION OF THE DRAWINGS

In the drawings:

FIG. 5a is a representation of a scanning force microscopy scan obtained with a conventional system having internal feedback.

FIG. 5b is a representation of a scanning force microscopy scan obtained with a conventional system having external feedback with high frequency lock-in.

FIG. 5c is a representation of a scanning force microscopy scan obtained in accordance with the invention having heterodyne feedback with a first set of lock-in settings.

FIG. 5d is a representation of a scanning force microscopy scan obtained in accordance with the invention having heterodyne feedback with a second set of lock-in settings.

DETAILED DESCRIPTION OF THE INVENTION

Figure 1:
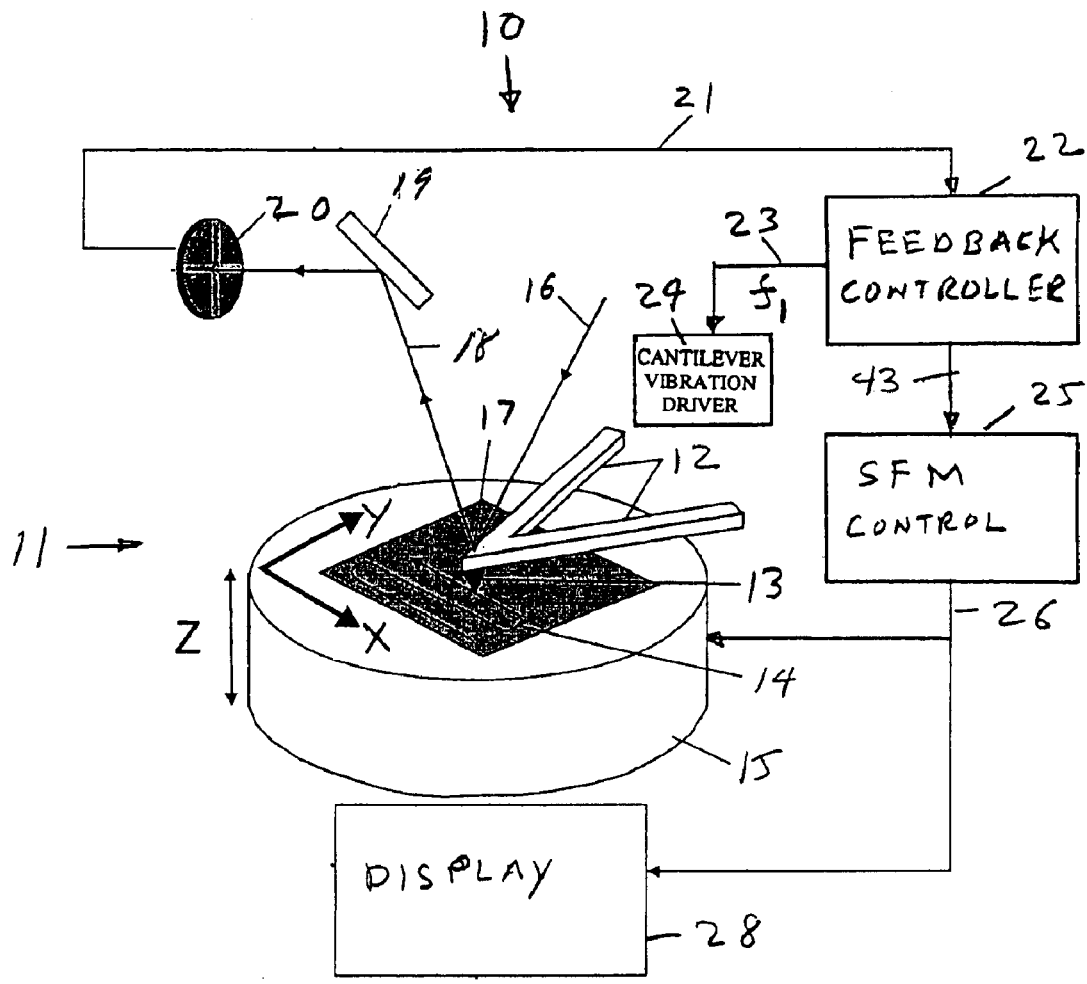
FIG. 1 is a simplified view of a scanning force microscope system in accordance with the invention.

With reference to the drawings, a simplified view of a scanning force microscope system incorporating the present invention is shown generally at 10 in FIG. 1. The system 10 includes a scanning force microscope 11 having a cantilever beam 12. The cantilever beam 12 supports a scanning tip 13 over a sample 14 supported on a scanner stage 15 that can be operated to translate the sample 14 in X, Y and Z directions, as illustrated in FIG. 1, with the Z direction being in a direction toward or away from the tip 13. In a conventional fashion, a laser beam 16 is reflected off of the back surface 17 of the cantilever 12, and the reflected beam 18 is deflected by a mirror 19 to a detector 20 that provides an output signal on a line 21 to a feedback controller 22. The feedback controller 22 provides an output signal on a line 23 at a frequency $f_1$ to a cantilever vibration driver 24 that is coupled to the cantilever beam 12 to vibrate the beam 12 at the drive frequency $f_1$, and provides output signals on lines 43 to an SFM control 25. X, Y and Z control signals are provided from the SFM control on lines 26 to the scanning stage 15, and the signals on the lines 26 are also provided to a monitor 28 that utilizes the X, Y and Z signals to generate a three-dimensional image that may be displayed to a user, for example, by a video display, liquid crystal display, etc. As the feedback controller 22 controls the scanner 15 to scan the sample with respect to the vibrating tip 13 in the X and Y directions to scan over the surface of the sample, the feedback controller provides a Z axis control signal to the scanner stage 15 to maintain the height of the tip above the sample substantially constant. This Z axis control signal is thus proportional to the height of the sample at each X and Y position as the tip 13 is scanned over the sample, and the Z axis signal thus can be utilized to generate the three-dimensional image which is shown on the display device 28. It is understood that the scanning force microscope may be implemented in other manners, for example, with the cantilever beam 12 mounted for Z axis displacement and with the scanning stage 15 utilized to scan the sample in the X and Y directions, or the sample 14 may be maintained stationary and the cantilever beam 12 may be mounted for scanning in X, Y and Z directions.

Figure 2:
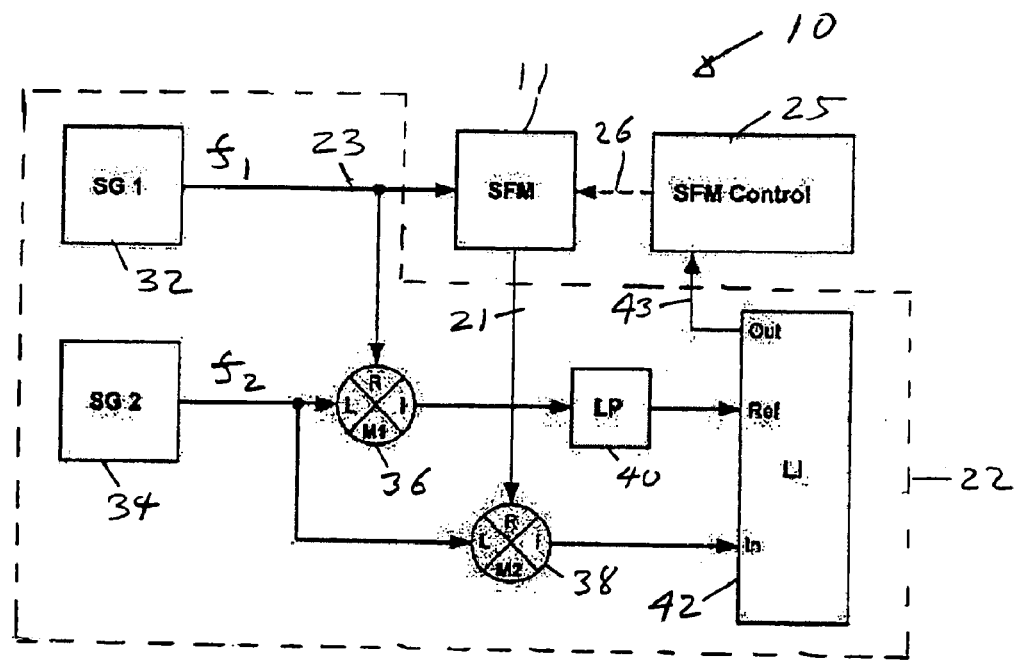
FIG. 2 is a block diagram of a scanning force microscope system having frequency mixing feedback in accordance with the invention.

The functional components of the scanning microscope system 10 in accordance with the invention using frequency downconversion are shown schematically in FIG. 2. The feedback controller 22 has two signal generators 32 and 34 (which may be a single instrument with two separate ouputs), two frequency mixers 36 and 38, a low pass filter 40, and a lock-in amplifier 42. The feedback controller 22 receives the probe signal at a high frequency $f_1$ from the line 21, and provides a Z axis control signal on a line 43 to the SFM control 25. The SFM control 25, which may be the internal conventional SFM control of a commercial SFM instrument, provides the Z axis control signal on the line 26 to the scanning force microscope 11. The signal generator 32 provides a preferably sinusoidal signal to the SFM that drives the cantilever probe 12 in the SFM 11 at its resonant frequency $f_1$, which is typically several hundred KHz, for example, between 300 kHz and 380 kHz. The signal from the signal generator 32 is also fed to the rf (R) input of the mixer 36. The signal from the signal generator 34, preferably sinusoidal at a second frequency $f_2$, is fed into the LO (L) ports of both mixers 36 and 38. The mixers 36 and 38 used can be, for example, 50 ohm, passive, low frequency mixers with coaxial connectors. The frequency $f_2$ of the signal from the signal generator 34 is chosen such that the difference frequency $\Delta f = |f_1 - f_2|$ is within the detection range of the lock-in amplifier 42 (for example, below about 102 kHz, e.g., at 95 KHz), allowing standard low frequency lock-in amplifiers to be used as the detector in the present invention.

After low-pass filtering in the filter 40, the output of the mixer 36 is the reference signal received by the lock-in amplifier 42. The low pass filter 40 can be a third order filter that yields a stable reference for the lock-in amplifier 42. Higher order filters can be used because the system of the invention operates at a constant frequency and is therefore not prone to variations in the phase response that arise from changing frequency. The output signal from the low pass filter 40 is at a constant frequency with changing amplitude and phase. Preferably, the signal frequencies $f_1$ and $f_2$ are chosen such that no other significant intermodulation mixing products exist below the low pass cutoff of the filter 40. In general, it is preferred that a steep low pass filter 40 be used on the mixed signal.

The signal derived from the cantilever deflection is provided on the line 21 to the mixer 38. The signal on the line 21 can be provided in a conventional manner by the SFM instrument 11, for example, as illustrated above, from a photodetector 20 receiving a laser beam 18 reflected from the cantilever probe 12. However, any other technique or system for detecting the cantilever vibration may be used. The downconverted output signal of the mixer 38 contains amplitude and phase information of the tip-sample interaction. The output signal from the mixer 38 is fed to the lock-in amplifier 42 where the appropriate frequency component is filtered and measured. The demodulated DC output signal of the lock-in amplifier 42 is provided on the line 43 to the SFM control 25 for Z axis control of the SFM 11.

Advantageously, the technique described in relation to the system 10 of FIG. 1 accommodates the resonant frequency of any type of cantilever 11, since frequency mixers are available into the GHz range. In fact, higher frequencies are easier to use because the mixing products are separated even farther. Thus, the present invention is also useful for reading the vibrations of MEMS at the nanometer-scale (NEMS), where vibration frequencies have exceeded 500 MHz.

Figure 3:
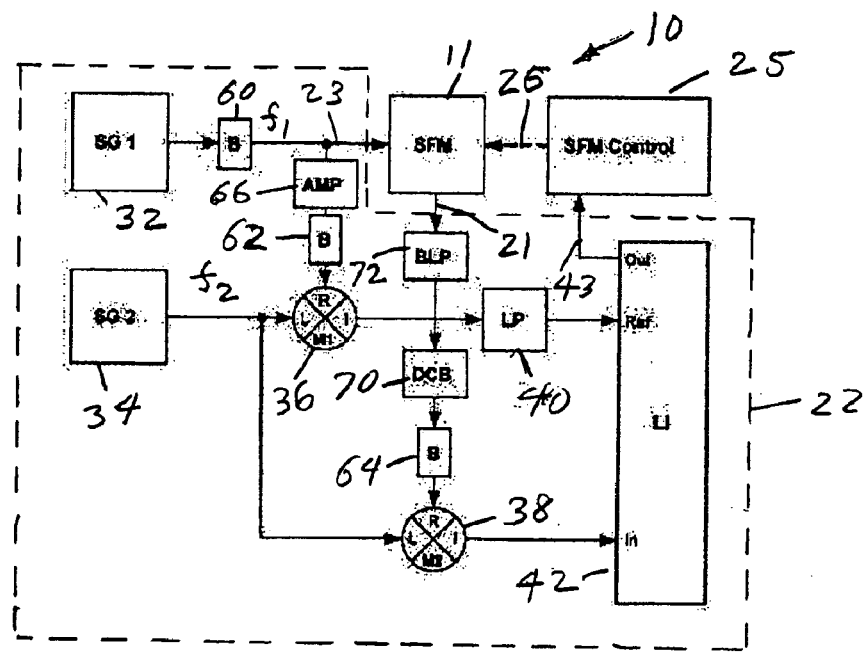
FIG. 3 is a block diagram of a preferred implementation of a scanning force microscope system having frequency mixing feedback in accordance with the invention.

FIG. 3 illustrates a preferred embodiment of the system 10 having downconversion frequency mixing SFM feedback realization. The scanning force microscope (SFM) 11 can be implemented using a commercial SFM unit, an example of which is a TM Microscopes Explorer unit manufactured by TM Microscopes (Veeco Metrology Group) of Sunnyvale, Calif. The SFM driving signal and response signal are preferably buffered before mixing. For example, the system 10 can include buffers 60, 62, and 64; an amplifier 66; a low pass (LP) filter 40; a DC-Block (DCB) 70; and a low pass filter (BLP) 72. In an exemplary embodiment, the buffers 60, 62, and 64 are simple designs based on LM6221 line driver integrated circuits, e.g., manufactured by National Semiconductor Corp. of Santa Clara, Calif. The amplifier 66 may be a simple, buffered, voltage amplifier, using TL072 ICs, for example, that increases the amplitude of the signal traveling from the signal generator 32 to the mixer 36. The amplifier 66 amplifies the reference signal on the line 23 and enables the lock-in amplifier 42 to lock on steadily to the reference. The BLP filter 72 may be, for example, a Mini-Circuits coaxial passive BLP-1.9 low pass filter with a cutoff frequency of 1.9 MHz. The BLP filter 72 can be used to filter the cantilever signal from the SFM instrument on the line 21. The coaxial DC-Block (DCB) 70 is used to remove DC offset in the signal on the line 21 from the SFM. The mixers 36 and 38 may be conventional commercially available mixers, e.g., Mini-Circuits Model ZAD-8 with an operating range of 500 Hz to 10 MHz, from Mini-Circuits, Brooklyn, N.Y. The signal generators 32 and 34 may be a Hewlett-Packard HP 3314A. The two signal generators can be implemented using a single signal generator unit that produces two or more output signals, or in any other way to provide signals at two frequencies. All of these components are provided for exemplification only, and any other components providing appropriate functions may be used.

Figure 4:
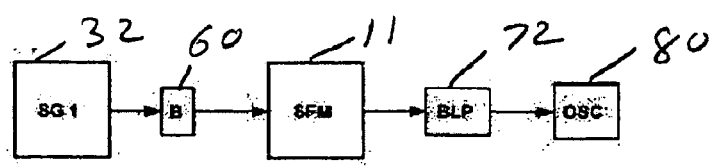
FIG. 4 is a block diagram of a system for finding the resonant frequency of a cantilever beam probe in a scanning force microscopy system.

FIG. 4 illustrates the system of FIG. 3 reconfigured so it may be utilized to find the resonant frequency of the cantilever 12. This configuration allows the resonant frequency of the cantilever to be found without requiring the use of a mixer. The signal generator 32 is connected through the buffer 60 to the SFM cantilever drive input of the SFM 11, and the cantilever response signal is low pass filtered by the filter 72, and is observed on an oscilloscope 80. The frequency of the signal from the signal generator 32 is varied until the global maximum of vibration amplitude is found by observation on the oscilloscope 80. In this manner, a driving amplitude can be found that is large enough to be easily detected but that does not cause distortions in the cantilever signal.

A particular advantage of the present invention is that downconversion in frequency of the probe signal allows the use of conventional lock-in amplifiers as the vibration signal demodulators. Commercial lock-in amplifiers typically produce an output signal which is a DC voltage between −10V and +10V that is proportional to the amplitude of the signal component at the reference frequency. Examples of commercial lock-in amplifiers are Models SRS 830 and SRS 850 from Stanford Research Systems, Sunnyvale, Calif. Although the use of a lock-in amplifier is advantageous, the invention is not limited to lock-in amplifiers, and other signal detectors may be used, examples only of which include filtering and rms-to-DC conversion, analog to digital conversion and subsequent digital signal processing, logarithmic operational amplifiers, and analog dividers.

In addition to amplitude feedback using amplitude detectors, e.g., the lock-in amplifier 42, the present invention may be implemented using a phase detector to detect differences in phase between the probe signal and the reference signal. In some cases, the phase signal may be too slow to be used for feedback because the X and Y output channels have too small a bandwidth (e.g., of 100 KHz), since a typical lock-in amplifier updates the phase signal at too slow a rate, e.g., at 512 Hz for typical commercial lock-in amplifiers. Phase feedback may be employed using a circuit that extracts the phase out of the X and Y values in real time, similar to the manner in which the absolute value of the feedback value is reconstructed from lock-in outputs. A suitable phase locked loop (PLL) circuit may be used for this purpose.

Figure 5:
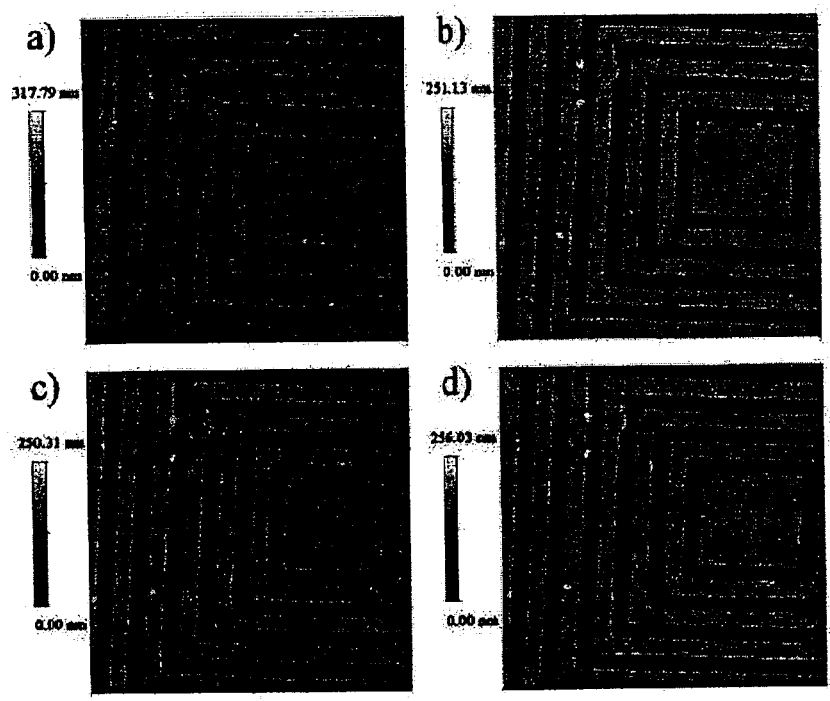

FIG. 5 shows 20-$\mu$m scans of a commercial test sample for AFM. FIGS. 5$a$–$d$ show three 20 $\mu$m range SFM scans comparing internal feedback (FIG. 5$a$), external feedback with high-frequency lock-in (FIG. 5$b$), and the feedback system of the invention with two different lock-in settings (FIGS. 5$c$ and $d$). FIG. 5$c$ shows a scan where the lock-in amplifier time constant is 100 $\mu$s with 24 db/octave filter roll-off. FIG. 5$d$ shows a scan where the time constant is 10 $\mu$s with 12 db/oct and filter roll-off.

All images displayed in FIGS. 5$a$–$d$ have a resolution of 500 by 500 data points. The setpoint for distance feedback was chosen between 30% and 45% of the full vibration amplitude. First order leveling can be applied to remove the tilt between sample and scanner planes. The sample used for the scans of FIGS. 5a–d consists of 1 μm wide chromium lines with equal spacing on an indium tin oxide (ITO) thin film and a quartz substrate. Here, the normal feedback system (internal to the SFM system) in FIG. 5a is compared to using an SRS 844 rf lock-in amplifier, without mixing setup in FIG. 5b and with the present invention in FIGS. 5c and d. These last two images (FIGS. 5c and 5d) present results using the two extreme lock-in settings that still yielded stable feedback. In FIG. 5c, the time constant (TC) is 100 μs with 24 db/oct and filter roll-off. In FIG. 5d, the time constant is 10 μs with 12 db/octave roll-off. Scan speed for all images was 1 line/s.

For the scans of FIGS. 5a–d, the resonant frequency of the cantilever used is $f_1$=312.3 kHz, and it was mixed with a signal at $f_z$=291 kHz down to 21.3 kHz for the scans of FIGS. 5c and 5d. It can be seen that the present invention can be reproducibly used for SFM feedback if fast time constants are selected. Disparities in images between the internal and external feedback implementations are due to the repositioning of the probe and to sample handling occurring while changing between setups.

Figure 6:
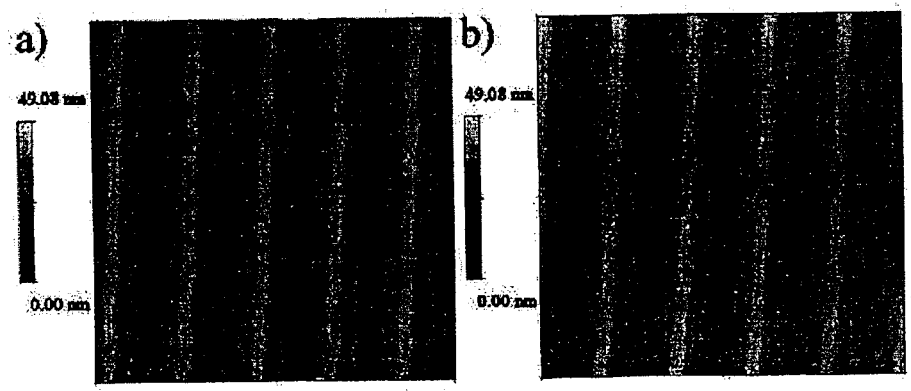
FIG. 6a is a representation of a scanning force microscopy scan obtained in accordance with the invention having heterodyne feedback with a high frequency difference between the mixed signals.
FIG. 6b is a representation of a scanning force microscopy scan obtained in accordance with the invention having heterodyne feedback with a low frequency difference between the mixed signals.

FIGS. 6a and b show 5 μm range SFM scans comparing feedback using high Δf (FIG. 6a) and low Δf (FIG. 6b). FIGS. 6a and b display 5-μm images taken on a grating with 1-μm spacing. These scans were taken with tips fabricated having $f_1$=384.5 kHz at 2 lines/s. The lock-in was set to TC=30 μs with 12 dB/oct filter roll-off. Scans in FIGS. 6a and b represent scans with Δf=84.5 kHz in FIG. 5a and Δf=14.5 kHz in FIG. 6b. In general, Δf should be higher than 10 kHz since a signal with low Δf needs longer integration times for low-noise detection, which complicates establishing a stable feedback loop.

Figure 7:
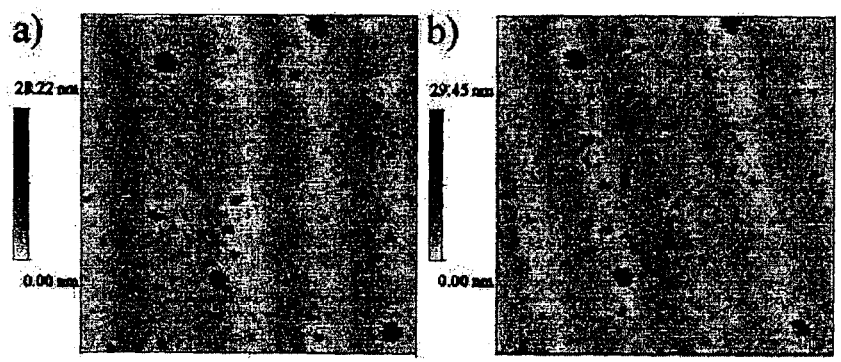
FIG. 7a is a representation of a scanning force microscopy scan on a flat substrate obtained in accordance with the invention, with a scanning speed of two lines per second.
FIG. 7b is a representation of another scanning force microscopy scan on a flat substrate in accordance with the invention, with a scanning speed of four lines per second.

FIGS. 7a and b present 2-μs scans at varying and relatively high speeds on a smooth silicon sample with minor topographical features. The scan speed used for the scan in FIG. 7a is 2 lines/sec. The scan speed used for the scan in FIG. 7b is 4 lines/sec. The cantilever used (e.g., a TM Microscopes model 1650-00 cantilever) has its first resonance at $f_1$=305.0 kHz, mixed down to 90.0 kHz. The lock-in settings are TC=30 μs with a 12 dB/oct roll-off. These scans are taken at the limits of the SFM system, which is equipped with 100 μm tripod scanners and not suitable for extremely high resolution.

The four larger spots are well resolved at all speeds. The smaller spots, typically shallower than 10 nm and on average 50 nm wide, are not reproducibly imaged. A short numerical calculation shows that this irregularity is unlikely to be caused by the feedback system: at 12 dB/oct roll-off, the signal takes 5 TC to get within 1% of the final reading.

In the case of FIG. 7b, the tip scans at a speed of 16 μm/sec. With the lock-in amplifier settings mentioned above, the signal preferably settles within 1% every 2.4 nm. In this scan, each data point represents a 4 nm by 4 nm spot, thus the lock-in signal should not be at fault. The images also display a low-level (<5 nm) noise component, visible as stripes that change position and direction between FIGS. 7a and 7b.

The described scans show no artifacts or additional noise for scans between the 2 μm and 20 μm range, for various scan speeds, lock-in settings, difference frequencies and samples.

The present invention can be carried out to detect probe signals that may occur at higher frequencies than the frequency at which the probe is driven, such as at harmonics of the drive frequency. See, for example, R. Hillenbrand, et al., "Higher-harmonics generation in tapping-mode atomic-force microscopy: Insights into the tip-sample interaction," Applied Physics Letters, Vol. 76, No. 23, pp. 3478–3480, which shows that a cantilever probe driven at a frequency f will also have some movement at higher harmonic frequencies, for example 2*f, because of non-linear tip-sample interaction. These non-linear tip-sample interactions reveal differences in material properties that cannot be seen when observing only the base frequency f. This higher harmonic imaging is well suited to be carried out by the present invention, because these frequencies can be at several MHz, even where standard low frequency non-contact AFM tips are used. Down converting these higher frequency components in accordance with the invention allows the use of essentially any existing AFM system as a feedback source.

Figure 8:
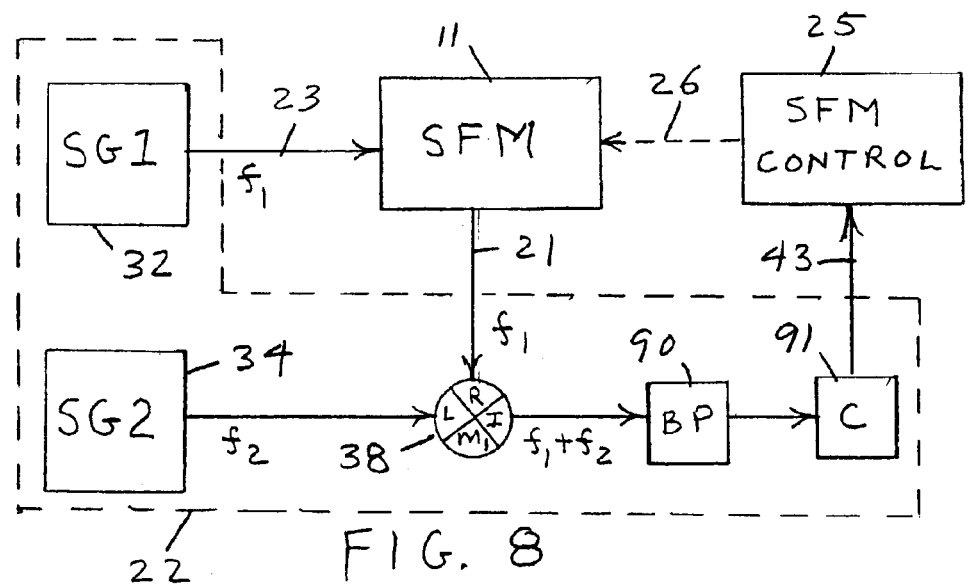
FIG. 8 is a block diagram of a scanning force microscope system in accordance with the invention utilizing frequency mixing feedback with frequency upconversion.

The present invention may also be carried out utilizing frequency upconversion in addition to frequency downconversion. An exemplary system incorporating frequency upconversion in accordance with the invention for controlling a scanning force microscope is shown schematically in FIG. 8. The system of FIG. 8 is similar to that of FIG. 2, except that the mixer 36 and the low pass filter 40 are eliminated and a different detector is used rather than the lock-in amplifier 42 shown in FIG. 2. The output of the mixer 38, which is a signal at about the frequency $f_1+f_2$, is provided to a bandpass filter 90 having a very narrow pass band centered at the frequency of $f_1+f_2$. Ideally, the frequencies $f_1$ and $f_2$ are close to each other so that the sum of these frequencies, $f_1+f_2$ is approximately equal to 2 $f_1$. The mixed frequency signal from the mixer 38 is bandpass filtered in the filter 90 to provide an output signal to a detector 91 which may be, for example, a crystal detector (a common power detector for microwave frequencies). The bandpass filter 90 is preferably of a very high quality, and of a higher quality than that utilized in downconversion systems, since in a downconversion system the difference frequency $f_1-f_2$ will generally be much smaller than each of the frequencies $f_1$ and $f_2$, while the sum frequency $f_1+f_2$ is only twice as large as either of the frequencies $f_1$ and $f_2$. The high frequency bandpass filter 90 may be implemented utilizing resonant cavity filters which are well-suited to provide high quality filtering of high frequency signals and have ultra-high Q factors.

The system of FIG. 8 may also be utilized in a frequency downconversion embodiment in which the filter 90 is a low pass filter that cuts off the higher frequency intermodulation products of the signals at the frequencies $f_1$ and $f_2$ with, for example, a crystal detector 91 utilized to detect and demodulate the signal passed from the low pass filter. The power in the filtered signal is detected by the crystal detector 91 to provide a DC signal to the SFM control 25. Other types of detectors may also be utilized for the detector 91.

Figure 9:
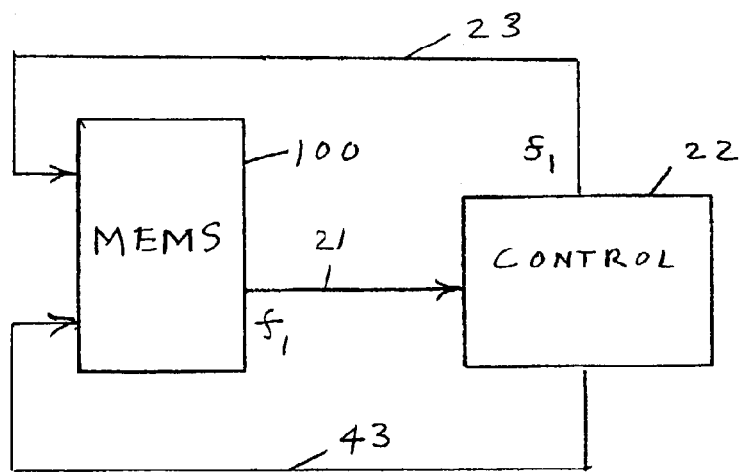
FIG. 9 is a block diagram illustrating the present invention embodied in a MEMS system.

The present invention may also be carried out for the monitoring and control of other types of MEMS devices in addition to scanning force microscopes. An example of a general system for providing controller monitoring signals to a MEMS system shown generally at 100 is illustrated in FIG. 9. The MEMS system 100 responds to an input signal at a frequency $f_1$ that is provided on an input line 23 from the controller 22 of the invention. The MEMS system 100 also receives a control signal on a line 43, which may be provided from the controller 22, and a signal representing the response of the MEMS system 100 modulated at the frequency fi is provided on a line 21 to the control 22. The control 22 may be implemented in the manner described above and illustrated at 22 in FIGS. 2, 3, and 8. Depending on the nature of the MEMS system 100, the input signal to the MEMS system may be an optical light beam, an electric current, or any other type of signal. Examples of such MEMS systems with which the present invention may be utilized are described in, e.g., A. Erbe, et al., "Silicon-On-Insulator Based Nanoresonators for Mechanical Mixing at Radio Frequencies," IEEE Transactions on Ultrasonics, Ferroelectrics and Frequency Control, Vol. 49, No. 8, 2002, pp. 1114–1117.

It is understood that the invention is not limited to the embodiments set forth herein as illustrative, but embraces all such forms thereof as come within the scope of the following claims.

What is claimed is:

1. A method of control of a probe tip in a scanning force microscope, the method comprising:
   (a) receiving a probe tip vibration signal from a scanning force microscope;
   (b) frequency converting the probe tip vibration signal by heterodyning to a frequency converted signal that is at a higher or lower frequency than the probe tip vibration signal; and
   (c) providing a probe tip control signal based on the frequency converted signal.

2. The method of claim 1 wherein the frequency converted signal is a downconverted signal at a lower frequency than the probe tip vibration signal and the probe tip control signal is provided using a lock-in amplifier that receives the downconverted signal.

3. The method of claim 1 wherein frequency converting the probe tip vibration signal comprises mixing the probe tip vibration signal and a lower frequency signal from a signal generator in a mixer.

4. The method of claim 1 wherein a first signal at a high frequency and a second reference signal at a lower frequency are provided to a mixer and the mixed signal is provided to a low pass filter to provide a reference signal to a lock-in amplifier that also receives the frequency converted signal comprising the probe tip vibration signal mixed with the second reference signal, the lock-in amplifier providing the probe tip control signal.

5. The method of claim 1 further comprising determining a resonant frequency of the probe tip.

6. A scanning force microscope feedback controller system for a scanning force microscope instrument of the type having a probe tip that can be driven in vibration and a detector providing a probe tip vibration signal indicative of the vibration of the probe tip, comprising:
   (a) two signal generators, one signal generator providing a drive signal at a high frequency available to be provided to the probe tip to drive it in vibration and the other signal generator providing a lower frequency signal;
   (b) two mixers, a first of the mixers receiving the signals from the high frequency and lower frequency signal generators and providing an output comprising the mixed signals, a low pass filter receiving the output of the first mixer and low pass filtering it to provide a reference signal, a second of the mixers receiving the probe tip vibration signal and the lower frequency signal and providing a downconverted output signal; and
   (c) a detector configured to receive the reference signal from the first mixer and the downconverted signal from the second mixer, the detector providing a probe tip control signal.

7. The system of claim 6 wherein the detector comprises a lock-in amplifier.

8. The system of claim 6 further comprising buffers configured to buffer the high frequency signal provided to the first mixer and to buffer the probe tip signal provided to the second mixer.

9. The system of claim 6 wherein the low pass filter comprises a third order filter coupled to the output of the first mixer.

10. A feedback controller system for a scanning force microscope, the system comprising:
    (a) means for receiving a probe tip vibration signal from a scanning force microscope;
    (b) means for frequency converting the vibration signal by heterodyning to a frequency converted signal that is at a higher or lower frequency than the probe tip vibration signal; and
    (c) means for providing a probe tip control signal based on the frequency converted signal.

11. The system of claim 10 further comprising means for determining a resonant frequency of a scanning force microscope tip.

12. The system of claim 10 wherein the means for frequency converting includes a signal generator providing a signal at a lower frequency than the frequency of the probe tip vibration signal, and a mixer that receives the probe tip vibration signal and the signal from the signal generator and mixes them to provide the downconverted signal.

13. The system of claim 10 wherein the means for frequency converting provides a frequency downconverted signal and the means for providing a probe tip control signal includes a lock-in amplifier that receives the downconverted signal.

14. A scanning force microscope system comprising:
    (a) a scanning force microscope instrument having a probe tip that can be driven in vibration and a probe tip vibration detector providing a probe tip vibration signal indicative of the vibration of the probe tip;
    (b) two signal generators, one signal generator providing a drive signal at a high frequency to the probe tip to drive it in vibration and the other signal generator providing a lower frequency signal;
    (c) two mixers, a first of the mixers receiving the signals from the high frequency and lower frequency signal generators and providing an output comprising the mixed signals, a low pass filter receiving the output of the first mixer and low pass filtering it to provide a reference signal, a second of the mixers receiving the probe tip vibration signal and the lower frequency signal and providing a downconverted output signal; and
    (d) a signal detector configured to receive the reference signal from the first mixer and the downconverted signal from the second mixer, the signal detector providing a probe tip control signal.

15. The system of claim 14 wherein the signal detector comprises a lock-in amplifier.

16. The system of claim 14 further comprising buffers configured to buffer the high frequency signal provided to the first mixer and to buffer the probe tip signal provided to the second mixer.

17. The system of claim 14 wherein the low pass filter comprises a third order filter coupled to the output of the first mixer.

18. A method of control of a microelectromechanical system that provides a vibration signal, the method comprising:

(a) receiving a vibration signal from a microelectromechanical system;

(b) frequency converting the vibration signal by heterodyning to a frequency converted signal that is at a higher or lower frequency than the vibration signal; and (c) providing a control signal based on the frequency converted signal.

19. The method of claim 18 wherein the frequency converted signal is a downconverted signal at a lower frequency than the vibration signal and the control signal is provided using a lock-in amplifier that receives the downconverted signal.

20. The method of claim 18 wherein frequency converting the vibration signal comprises mixing the vibration signal and a lower frequency signal from a signal generator in a mixer.

21. The method of claim 18 wherein a first signal at a high frequency and a second reference signal at a lower frequency are provided to a mixer and the mixed signal is provided to a low pass filter to provide a reference signal to a lock-in amplifier that also receives the frequency converted signal comprising the vibration signal mixed with the second reference signal, the lock-in amplifier providing the control signal.

22. A controller system for a microelectromechanical system that provides a vibration signal, the system comprising:

(a) means for receiving a vibration signal from a microelectromechanical system;

(b) means for frequency converting the vibration signal by heterodyning to a frequency converted signal at a higher or lower frequency than the vibration signal; and (c) means for providing a control signal based on the frequency converted signal.

23. The system of claim 22 wherein the means for frequency converting includes a signal generator providing a signal at a lower frequency than the frequency of the vibration signal, and a mixer that receives the vibration signal and the signal from the signal generator and mixes them to provide the frequency converted signal.

24. The system of claim 22 wherein the means for frequency converting provides a frequency converted signal that is downconverted in frequency and the means for providing a control signal includes a lock-in amplifier that receives the frequency converted signal.

* * * * *